Oct. 7, 1941.  G. M. CRESSATY  2,258,540
ILLUMINATED VANITY CASE
Filed June 14, 1938  3 Sheets-Sheet 1
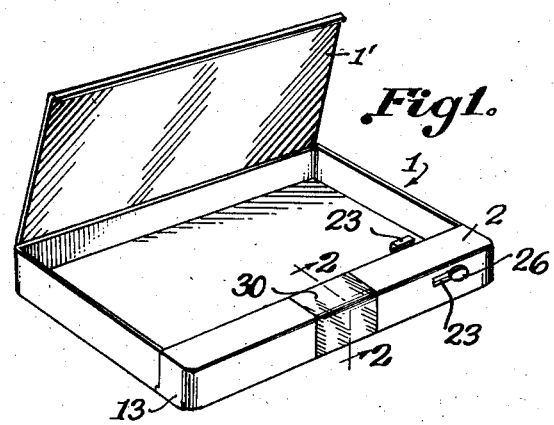
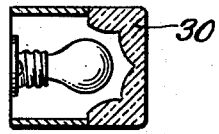
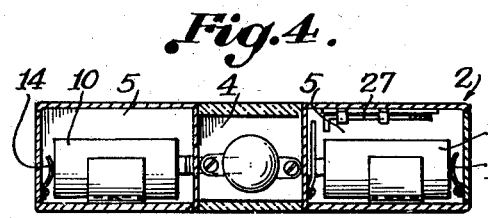
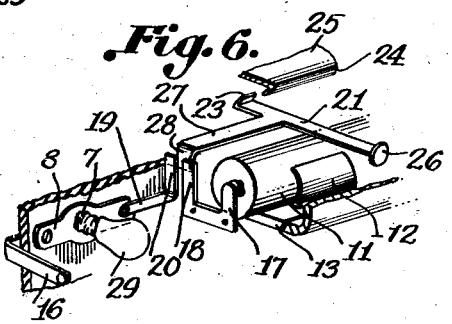
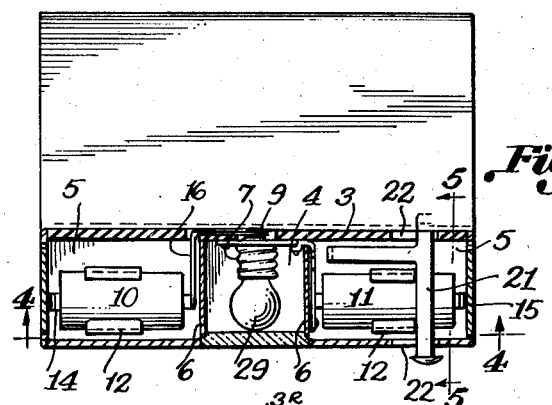
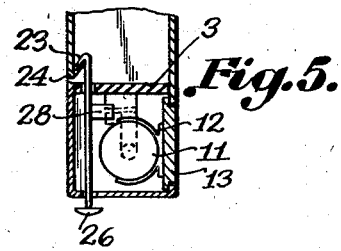
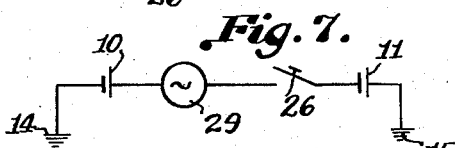
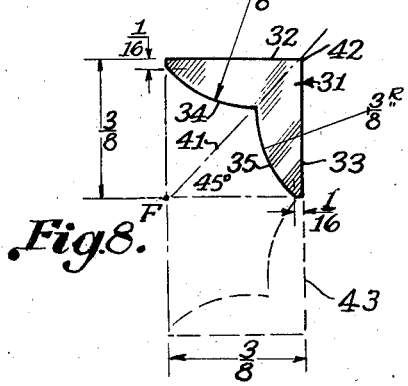
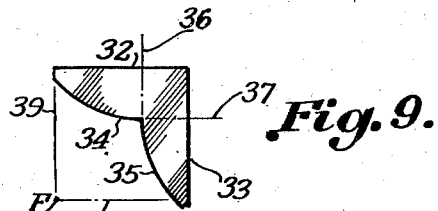
INVENTOR.
GEORGE M. CRESSATY.
BY David W. Gould
ATTORNEYS.

Oct. 7, 1941.  G. M. CRESSATY  2,258,540
ILLUMINATED VANITY CASE
Filed June 14, 1938  3 Sheets-Sheet 2
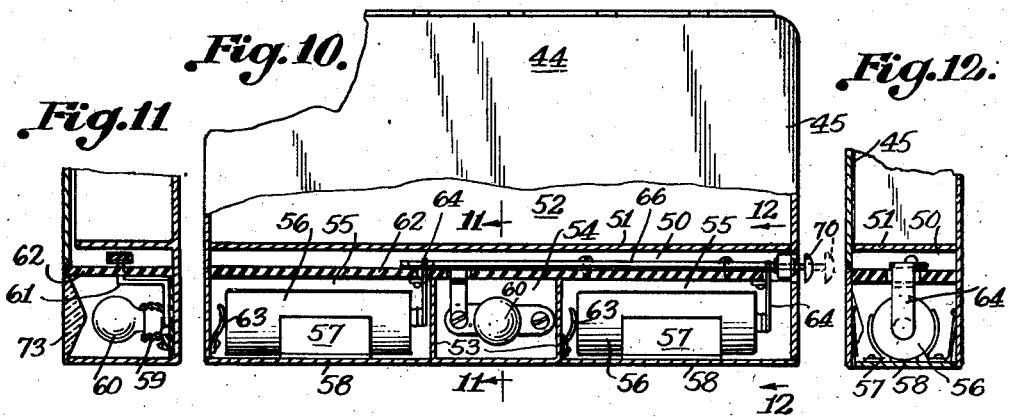
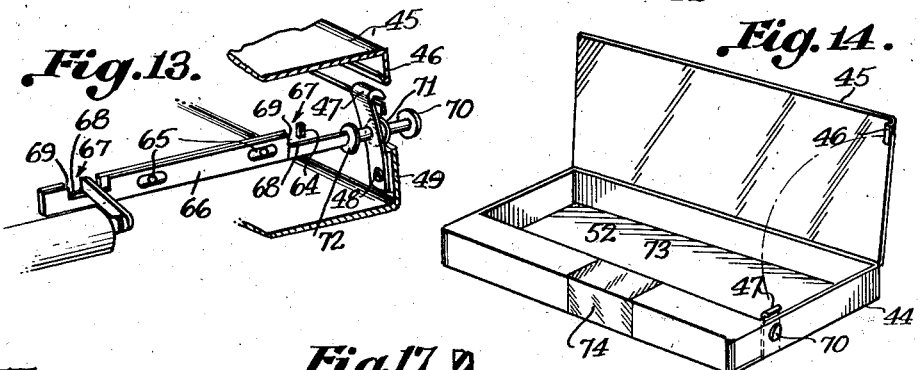
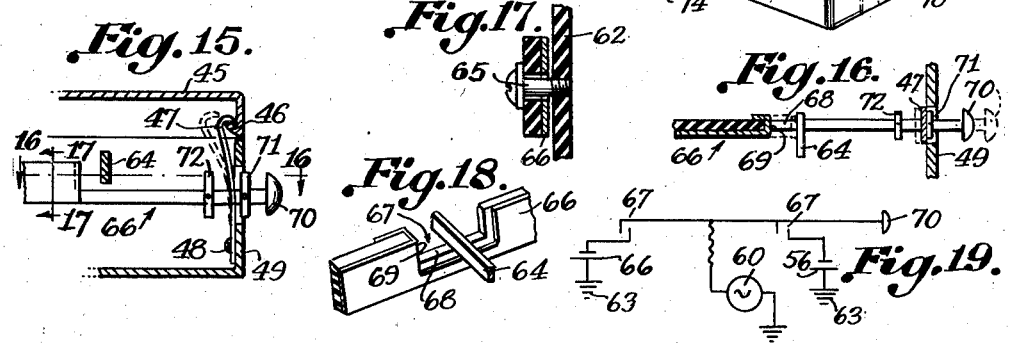
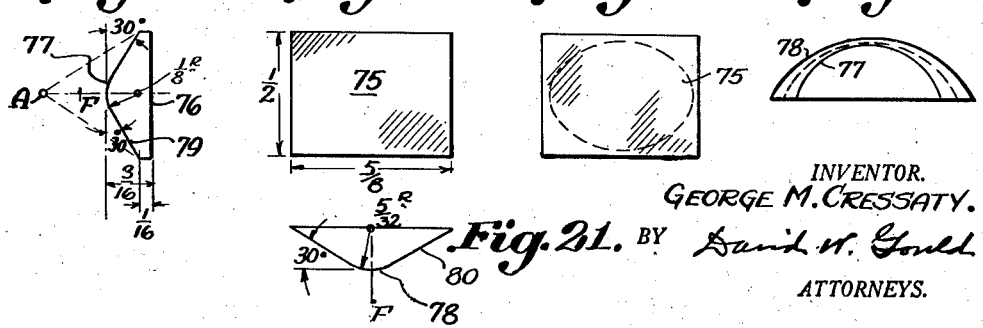
INVENTOR.
GEORGE M. CRESSATY.
BY
ATTORNEYS.

Oct. 7, 1941.    G. M. CRESSATY    2,258,540
ILLUMINATED VANITY CASE
Filed June 14, 1938    3 Sheets-Sheet 3
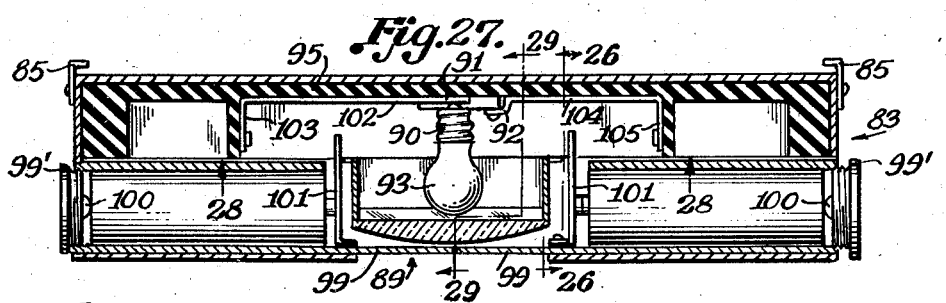
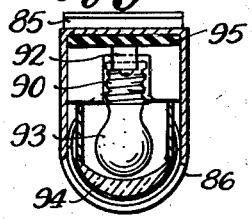
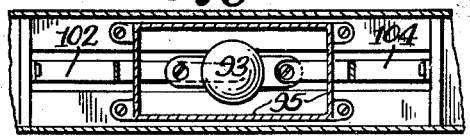
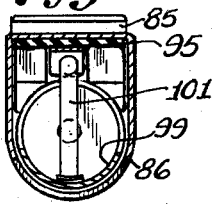
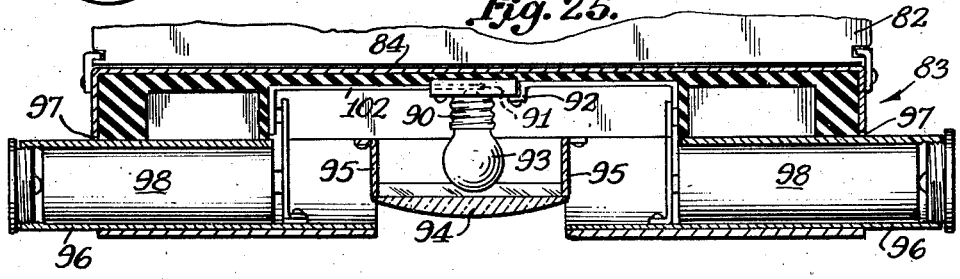
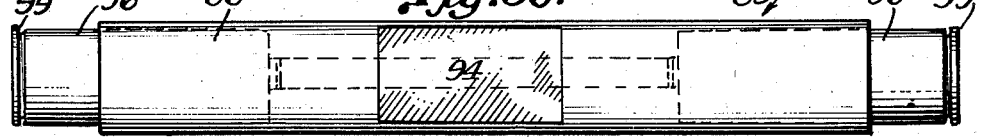
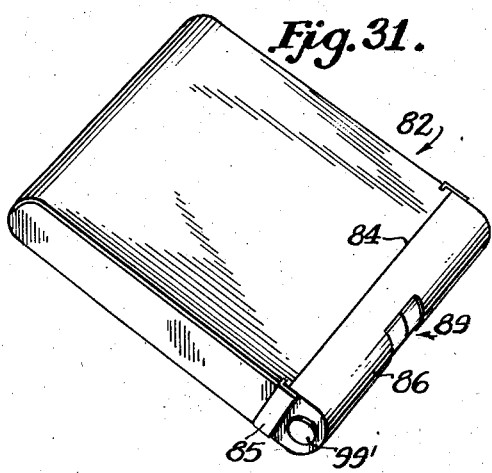
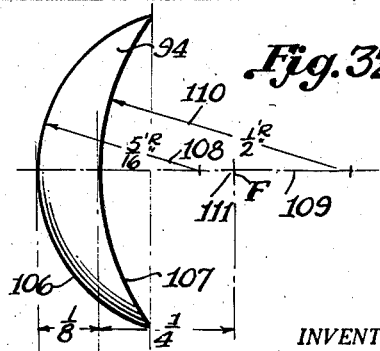
INVENTOR.
GEORGE M. CRESSATY.
BY David W. Gould
ATTORNEYS.

Patented Oct. 7, 1941

2,258,540

UNITED STATES PATENT OFFICE 2,258,540

ILLUMINATED VANITY CASE

George M. Cressaty, New York, N. Y.

Application June 14, 1938, Serial No. 213,671

20 Claims. (Cl. 240—6.45)

This invention is directed to a compact or other cosmetic carrier having means for providing a source of particularly directed and selectively controlled illumination, which by means of appropriate lenses, provide for proper light intensity and spread to illuminate the face of the user in the mirror section of said compact.

Ordinarily, in daylight, the lighting is sufficient to enable the user to secure the desired result, but at night-time, or in places where the natural illumination is insufficient, make-up with the ordinary compact is impracticable if not impossible, and considerable difficulty is encountered with a compact having a bulb alone which may be effective for general illumination but ineffective in the present use as, not only does it disturb others, but its spread leaves a definitely low intensity for the person using the mirror.

The present invention is designed with a view to enable the compact to carry its own lighting source, with selected means for energizing and controlling the same, with a lens for the light source of such construction that the user may have the full advantage of a complete beam of symmetrical or asymmetrical pattern with maximum intensity, while using conventional miniature batteries and bulb.

Another object of the present invention is the provision of a light source and lens in a compact or like carrier which is fixed with relation to the body of the carrier and independent of mirror movement, together with means for selectively energizing the light source to utilize the illumination for make-up purposes.

A further object of the invention is the provision of means for energizing the light source connected to the means for releasing the usual spring opening cover or lid of the compact, with such means constructed and operated to selectively release the lid or cover and then energize the light source; to release the lid or cover without energizing the light source; to energize the light source without releasing the cover; or to close the lid or cover and automatically deenergize the light source.

Another object of the invention is the application of the improvement to vanity cases and to provide therewith a lighting unit, with the light source manually controlled and the lighting unit removably associated with the said case to permit bodily removal of the unit from the case proper when it is desired to utilize the light source of the unit as an independent element, for example in the nature of a flashlight.

A further object of the invention is the provision of a lighting unit having manually operable end sections movable toward and from each other, and which, when moved from each other, expose the light source and simultaneously energize the light source, and when moved toward each other, completely conceal the light source, and deenergize the light source, all in a unit container, unexposed to breakage, conveniently carried or inserted and cheaply manufactured.

The invention in the several forms referred to is illustrated in the accompanying drawings, in which:

Figure 1 is a perspective view of a compact showing the preferred form of lighting unit, the lid of the compact being shown raised to illustrate the position of the lighting unit;

Figure 2 is a broken section on the line 2—2 of Figure 1 to particularly illustrate the lens construction;

Figure 3 is a plan view of the compact with the lighting unit casing shown in horizontal section and the lighting unit elements in plan;

Figure 4 is a section on the line 4—4 of Figure 3;

Figure 5 is a section on the line 5—5 of Figure 3;

Figure 6 is a broken perspective of the operating parts;

Figure 7 is a diagrammatic view of the circuit;

Figure 8 is an edge view of a lens designed for use in connection with the form of device shown in Figure 1;

Figure 9 is a diagrammatic view illustrating a formation of curvature for the lens;

Figure 10 is a view of a modified form showing a plan of a compact broken out and longitudinally sectioned to show the lighting unit;

Figure 11 is a section of the same on the line 11—11 of Figure 10;

Figure 12 is a section of the same on the line 12—12 of Figure 10;

Figure 13 is a broken perspective view showing the manually operable member for controlling the energization of the light source and for releasing the lid of the compact;

Figure 14 is a perspective view of the compact with the lid raised to illustrate the position of the lighting unit and the arrangement of the lens for controlling the light rays;

Figure 15 is a broken elevation, partly in section, of the operating element for controlling the opening of the compact lid and the energizing of the light source;

Figure 16 is a section on the line 16—16 of Figure 15;

Figure 17 is a section on the line 17—17 of Figure 15;

Figure 18 is a broken perspective showing one of the switch elements of the lighting unit of this form;

Figure 19 is a diagrammatic view of the circuit;

Figure 20 is a face view of the lens structure used in connection with the form shown in Figures 10 to 19, inclusive;

Figure 21 is a top plan view of the same;

Figure 22 is a side view of the same;

Figure 23 is a view illustrating diagrammatically the outline of the curved face of the lens;

Figure 24 is a diagrammatic view illustrating the relative curvatures of the inner lens face;

Figure 25 is a longitudinal section through the lighting unit of a modified form, the end sections being shown moved apart to expose the source of light and simultaneously energize the same;

Figure 26 is a section on the line 26—26 of Figure 27;

Figure 27 is a view similar to Figure 25, the movable sections being moved toward each other to conceal the light source and lens and to de-energize the light source;

Figure 28 is a section on the line 28—28 of Figure 27;

Figure 29 is a section on the line 29—29 of Figure 27;

Figure 30 is a front face view of Figure 25;

Figure 31 is a perspective view showing the lighting unit of this form attached to a vanity case or like carrier; and Figure 32 is a view of the lens designed for use in connection with the form shown in Figures 25 to 31, inclusive.

The preferred form of the invention is shown in Figures 1 to 9, inclusive, and includes a compact in the lid of which is provided a mirror or like reflective element. As illustrated, the compact is intended to designate any preferred type or conventional design, and the word "compact" is utilized as a general term for any cosmetic holder of any size or construction.

In this preferred form of the invention, the lighting unit is applied to a compact or like cosmetic carrier and is disposed in fixed relation to the body. The light source is designed to be selectively energized and the manually operable member for controlling this energization is also designed to control the opening of the lid or cover of the compact, that is, release the lid or cover to the influence of its opening spring.

In this form, the compact is illustrated generally at 1 and is provided along its longitudinal forward edge with a compartment 2 to house the lighting unit, the rear wall proper of the compartment being formed as an insulating strip 3. The compartment is divided into a central chamber 4 and end chambers 5 by spaced insulating transverse walls 6, and in the central chamber 4 is arranged a lamp socket 7, one contact of which is connected to a plate 8, secured to the insulating strip 3 and the other contact 9 of which extends through an opening in the insulating strip, as more particularly shown in Figure 6.

Batteries 10 and 11 are removably secured in the respective chambers 5 by spring clips 12 mounted on a removable slide door 13, one terminal of battery 10, for example, being grounded to the compact body at 14 and the other battery 11 being grounded to the compact body at 15. The other contact of battery 10 is connected by a conducting strip 16 to the contact 9 of the socket 7 while the other contact of battery 11 has a switch finger 17 in permanent engagement with the battery contact and terminating rearwardly of the battery in an upright contact finger 18. The strip 8 from the socket 7 has a finger extension 19 terminating in an upright spring finger 20 arranged in parallel spaced relation with the finger 18.

An operating element in the shape of a flat bar 21 is mounted for control movement of the compact lid and of the lighting unit. This member comprises an elongated bar extending through the forward wall of the case and guided in slots 22 in the forward wall of the compartment 5 and in the insulating strip. The rear end of the bar is provided with a nose 23 to engage a keeper lip 24 on the free edge of the compact cover 25, and, at the forward end beyond the wall of the compartment, with a finger-piece 26. At an appropriate point in its length, the longitudinal bar of the operator has a lateral extension 27 terminating in a downturned lip 28 of sufficient width to bridge the space between the spring contact fingers 18 and 20. It will thus be understood that the operator is capable of an inward movement to release the compact lid and a lateral movement to engage the fingers 18 and 20 to complete the circuit for energizing the bulb in the socket 7, which bulb is indicated at 29.

It will be understood, as illustrated in Figure 1, that the keeper lip 24 on the top 25 of the compact is of sufficient length to permit full lateral circuit controlling movement of the operator without releasing the lid, thereby permitting the light to be used as a source of temporary illumination without opening the compact. Ordinarily, however, the user moves the operator inwardly to disconnect the lid and permit it to open under the usual spring connection, and if the light should be desired the same operator is moved laterally to engage the contact fingers 18 and 20 and thus complete the energization of the light source through the circuit diagrammatically shown in Figure 7.

The lens for use in connection with the preferred form of construction is illustrated in Figures 8 and 9. The lens is of right angled construction including a body 31 presenting upper and forward outer straight surfaces 32 and 33. The inner surface of the lens is formed on an upper curved area 34 and a forward curved area 35. These curved surfaces have radii of equal length, that of the curved surface 34 having a center on a line as at 36 which is at right angles to the axis of the lens, and that of the curved surface 35 having a center on a line indicated at 37 parallel to the axis of the lens body and at right angles to the center line 36. The curves 34 and 35 intersect the straight surfaces 32 and 33 at one end and intersect each other at the juncture or intersection of the lines 36 and 37 on which the centers of the respective curvatures are placed. With this type of lens the filament of the lamp is arranged at the focus of the lens with such point determined by the intersection, indicated at 38, of surfaces 39 and 40, which of course are imaginary, projected parallel respectively of the surfaces 32 and 33 of the lens body. The direct ray, indicated at 41 in Figure 8, will pass in a straight line through the intersection of the curved surfaces 34 and 35 and through the intersection of the straight surfaces 32 and 33. The remaining rays, by reason of the particular curvatures, will be refracted toward this intersecting point, so that the light beam is in effect concentrated in a slightly upward direction through the corner at the juncture of the straight surfaces 32 and 33, as at 42, with, of course, increased intensity and with a beam spread which will effectively illuminate the face of the user of the vanity case. Where the lens described is alone utilized, the light is directed in an upwardly inclined direction. If it is desired that the light be also directed in the downward direction, the lens body may be duplicated, as indicated at 43 and shown in dotted lines in Figure 8. The effect of this duplication will be to project the light rays identically with the lens body first described but in a different direction.

In the modification shown in Figures 10 to 24, the compact 44 is provided with a lid or cover 45 having a keeper lug 46 designed to be engaged by a spring latch 47 secured at 48 to one wall of the body 49 of the compact. Here again, as in the preferred form, the illustration of the compact per se is contemplated as indicating any desired type, size or construction except insofar as the specific details hereinafter referred to are concerned.

At the forward edge of the body of the compact, that is, the edge remote from the hinge connection of the lid, there is arranged a substantially rectangular compartment 50 divided by a wall 51 from the cosmetic receiving compartment 52 of the compact. This compartment 50 is divided by transverse walls 53 disposed on opposite sides of the longitudinal center of the compartment, to provide an intermediate chamber 54 and substantially duplicate end chambers 55. Batteries 56 are arranged in each end chamber 55, being removably held in fixed position in said chamber by clips 57, mounted on plate 58.

A lamp socket 59, removably receiving a miniature bulb 60, has one contact connected to a bar 61 supported on an insulated strip 62 extending longitudinally of the chambers 54 and 55, the other contact of the socket being grounded to the metal of the body of the compact. One terminal of each battery 56 is grounded at 63 to the metal of the compact and the opposite contact of the battery is provided with a lateral contact finger 64, which extends through the insulation 62.

Slidably supported on the insulated strip 62 through pin and slot connections 65, is an insulating bar on which is mounted a metallic bar 66 notched at appropriate points, as at 67, to receive the respective contact fingers 64. The bottom wall 68 of each notch is covered by insulating material while the upright wall 69 at one end of the notch is free of such insulation so that when the contact fingers 64 are in any position in the notch other than in contact with the upright walls 69 of such notches, the fingers are insulated from the metallic slide bar 66.

The bar 66 extends through the spring latch 47 for holding the cover closed, and also through the adjacent wall 49 of the compact body. The slide bar is terminally provided beyond the wall 49 with a finger-piece 70 and on each side of the spring catch 47 the bar 66 is provided with fixed disk-like collars 71 and 72, which are spaced apart a distance to permit a sliding movement of the bar 66 commensurate with the length of the notch 67.

In the use of this form of lighting unit, the user first moves the bar 66 inwardly with respect to the compact to cause the hollow disk 71 to engage and move the spring latch 47 to a position free of the keeper 46 and thus free the lid or cover of the compact for opening. If at this time light from the bulb 60 is required, the user moves the slide bar 66 in the opposite direction, which movement is limited by contact of the disk collar 72 with the spring latch. At this limit of movement, the upright walls 69 of the notches 67 are in contact with the switch finger 64, and the circuit is completed through the batteries to the socket, as will be plainly seen in the diagrammatic view of the circuit shown in Figure 19. When the cover is open and light is on, disk collar 72 will be in contact with spring latch 47. On closing the cover, latch 47 will be sprung back to dotted line position as in Figure 15, deenergizing the circuit and also securing the cover even though the user fails to release finger-piece 70. Thus, the light is always extinguished automatically when the cover is closed.

In this form, it will be apparent that the light source may be energized without releasing the latch 47, by appropriate outward movement of such slide bar, permitting use of the light for any purpose, without necessarily providing access to the contents of the compact.

The upper wall of the compartment housing the lighting unit is throughout the extent of the central chamber 54 formed to receive a lens 73 and this lens may be placed at the front wall, or may be extended throughout the front wall, as indicated more particularly at 74 in Figure 14. Thus, the light controlled and directed by the lenses 73 and 74, either or both, will direct the light in proper focus and in definite form of beam spread, concentrated onto the face of the user of the compact with proper and efficient illumination.

The form of the lens used in connection with the vanity case illuminating means illustrated in Figures 10 to 19 inclusive is shown in Figures 20 to 24. Here the lens body 75 is plain or straight on its forward face at 76 and its rear face is particularly and peculiarly formed for the desired result of this type of illumination. The central area extends in all directions for approximately 30 degrees from the axial line of the lens body and this central area is a composite plane made up of two curved areas at substantially right angles to each other. This curved surface in the vertical direction, indicated at 77 in Figure 22, is formed on a radius of predetermined length having its center in the axial line of the lens body. The horizontally curved surface of this area is at 78 in Figure 21 and this curve is formed on a radius somewhat greater than the radius of the curvature 77.

The inner face of the lens body beyond the central curved area described is projected as a straight inclined surface extended toward the edge of the lens with such surface at approximately 30 degrees to the plain front surface 76. As the line of curvature 77 is on a shorter radius than the line of curvature 78, the straight surfaces 79 extending from such curved surface 77 will be on a slightly different plane than the straight surfaces 80 extending from the curved surface 78. This, in effect, will present a light refractive area which, when viewed from the face of the lens, will be of somewhat oval configuration, as shown in Figure 23. The relative curvatures of the respective curved areas of the inner face of the lens body are indicated graphically in Figure 24, from which it will be apparent that the sections intermediate the curved lines will be at approximately 45 degrees, and that the lens will have flat portions at the corners, if the lens is square as in Figure 20. This lens will intensify the light from between three to four times the bulb intensity and will obviously concentrate the beam within the desired area for the face of the user.

A further form of the invention is illustrated in Figures 25 to 32, inclusive. This improvement shown in use with a vanity case, indicated at 82, is illustrated as being designed for complete separation from said case in order that it may have independent and separate use, for example in the nature of a flashlight.

The lighting unit of this form is connected to the forward wall 84 of the vanity case by conventional connecting means 85, which will permit the lighting unit casing 83 to be removably connected to the wall of the vanity case, as shown more particularly in Figure 31. The casing 83 is of rounded form except for a flat inner wall to bear squarely against the forward wall of the vanity case. The rounded wall 86 of the unit is interrupted or cut away at the central portion to provide an opening 89 and secured to the flat wall of the unit within this opening is a light socket 90, one terminal of which is connected to a plate 91 while the other terminal 92 is in the battery circuit, as will later appear.

A lamp 93 is arranged in the socket 90 and an appropriate lens 94 supported on transverse walls 95 overlies the lamp.

Cylindrical housings 96 of less diameter than that of the fixed wall of the unit are slidably mounted in openings 97 in the end walls of the unit, and in each of these housings are batteries 98. The inner ends of the housings 96 are open and the wall of each housing at the inner end is cut away so as to provide a projecting portion 99 of such length and circumferential dimension that when the housings 96 are moved toward each other to their limit, the projecting portions of their walls at the inner ends will meet to completely cover the lens and other portions of the central opening of the lighting unit. The outer ends of the housings may be provided with appropriate finger-pieces 99' for manipulation of the housings. One contact of each battery is grounded at 100 and the opposite contact is connected to a contact strip 101 secured to and insulated from the particular housing.

The strip 91 connected to one terminal of the socket 90 has an arm 102 extending along the insulating wall 95 of the central chamber, with a depending end 103 extending outwardly in the path of movement of the battery connected contact member 101. The other contact 92 of the socket 90 is connected by a contact strip 104 insulated from the unit which has a forwardly extending portion 105 which extends in the path of movement of the arm 101 of the other battery connector of said unit.

The relation of the parts is such that when the housings 96 are moved to their inward limit to completely close the chamber having the light source, the arms, connectors 101 and batteries move toward each other and contact arms 103 and 105 and break the circuit to the lamp socket. When the housings 96, however, are moved to their outward limit to expose the chamber containing the light source, batteries and the arms 101 of the battery connectors are moved into contact with the contact arms 103 and 105 respectively, and the circuit is complete and the lamp energized.

As stated, the lighting unit, in this form, is completely separable from the vanity case when desired, and may be substantially closed by inward movement of the housings at will, which movement will disconnect the batteries from the light source, and present a substantially unbroken cylindrical element which may, if desired, be conveniently carried in the pocket. In either position, either when connected to the case or when separate therefrom, the light source may be energized and exposed by a simple relative outward movement of the housings.

The lens body preferably used in connection with the above construction is illustrated in Figure 32. This lens body, of appropriate transparent material, has an outer curved surface 106 and an inner curved surface 107, so that the lens is substantially concavo-convex in vertical section. The radius 108 of the surface 106 is of a predetermined length, having a center on the axial line 109 of the lens, while the inner curved surface 107 has a radius 110 with the center on the same axial line, but with radius 110, however, greater than the radius 108. The respective radii are of such relative lengths that the center point for the radius 108 is in advance, that is, between the focal point 111 of the lens, while the center for the radius 110 is in rear of such focal point relative to the lens. This lens is in the nature of a spheroid, but may be of cylindrical shape, as shown in Figure 32.

In the above description, reference is made in some forms to a compact and in another form to a vanity case. These specific references are intended to cover any and all carriers for the designed purpose, regardless of their specific names. Thus, cigarette cases, powder carriers, lip stick carriers, lighters, hand bags, as well as many other devices of this type, are to be specifically understood as being within the meaning of the definition of the elements to which the respective lighting units are connected.

While a detailed portrayal has been given of some of the forms the invention may take, in its optical as well as in its mechanical characteristics, it is not intended to limit the invention to the above description. The nature of the invention is such that it may be applied in connection with a multitude of different uses. Optical closures may be used or made of glass or of any other transparent material. Various modifications, changes or rearrangement of parts may be made. For instance, changes in angles or curvatures of the optical lenses in order to vary the light distribution, or any other mechanical alterations, may be effected without departing from the spirit of the invention and the scope of the appended claims.

What is claimed to be new is:

1. A vanity case having a lid and a body, a lighting unit mounted in the body and including a light source, batteries, and a normally open circuit between the batteries and the light source, an operator movable inwardly with respect to the body to release the lid of the case and laterally to complete the circuit between the batteries and light source.

2. A vanity case having a lid and a body, a lighting unit mounted in the body and including a light source, batteries, and a normally open circuit between the batteries and the light source, an operator movable in one direction to release the lid of the case and in an opposite direction to complete the circuit between the batteries and light source.

3. A construction as defined in claim 1, wherein the operator is terminally provided with a latching nose and the lid is provided with a keeper to be engaged by the nose for holding the lid in closed position, the keeper being of such length as to permit full lateral circuit closing movement of the operator without releasing the lid of the carrier.

4. A construction as defined in claim 1, wherein the operator includes a member having a finger-piece at one end, a latch nose at the opposite end and a lateral extension terminally providing a circuit closing element.

5. In a vanity case having a light source, a lens for the light source having a plain outer face of angularly related straight surfaces, the inner surface being of angularly related meeting curved surfaces of similar radii, each from a center on a line beyond the adjacent straight surface at right angles thereto and passing through the meeting point of the curved surface.

6. In a vanity case having a light source, a lens for the light source having a plain outer face of angularly related straight surfaces and independently curved inner sections having similar radii and intersecting at a point equidistant from the straight surface of the outer face.

7. In a vanity case the combination comprising; a body, a cover hinged to one side of the body, a compartment along the opposite side of the body, a cosmetic container adjacent said compartment, the lid covering only the cosmetic container when in closed position, longitudinally aligned spaced batteries in said compartment, a light source arranged between said batteries, a normally interrupted circuit to energize the light source from the batteries, and a manually operated sliding member movable in two directions, one for controlling the light source and the other for controlling the cover of said vanity case.

8. A vanity case comprising a body divided into two compartments, a hinged cover closing one of the compartments, a mirror on the inner side of said cover, longitudinally aligned spaced batteries in the other compartment, a light source arranged between said batteries and adapted to throw its light through an opening in the compartment on the face of a user looking at the mirror, a normally interrupted circuit to energize the light source from the batteries, manually operated sliding means movable in two directions and extending outside the compartment, one direction of movement being for controlling the circuit regardless of the open or closed condition of the case and the other direction being for controlling the cover.

9. In a vanity case, a body portion and a cover portion, a lighting unit mounted in the body portion, a manually slidable element controlling the lighting unit and the cover portion, said sliding element being movable in two directions, movement in one of said directions being inwardly of the case for freeing the cover portion, and movement in the other direction being laterally of the case for controlling said lighting unit.

10. A vanity case including a body, a cover therefor, releasable means for holding the cover in closed relation to the body, a light source, means for energizing the light source, and a manually operative element for successively or selectively at will releasing the cover holding means and controlling the energizing means.

11. A vanity case including a body, a cover therefor, releasable means for holding the cover in closed relation to the body, a light source, means for energizing the light source, and a unit element movable successively in relatively different directions, one such direction controlling the cover releasing means and the other such direction controlling the light source, either such movements being selective as the initial movement.

12. A vanity case including a body, a cover therefor, releasable means for holding the cover in closed relation to the body, a light source, means for energizing the light source, and a unit element movable successively in relatively different directions, one such direction controlling the cover releasing means and the other such direction controlling the light source, either such movement being complete as to function and constituting at will the only necessary movement of the element.

13. A vanity case including a body, a cover therefor, releasable means for holding the cover in closed relation to the body, a light source, means for energizing the light source, and means movable longitudinally in one direction to release the cover and in the opposite direction to control the energizing means for the light source, the said operations of said means being successive or selective at will.

14. A vanity case including a body, a cover therefor, a securing element for holding the cover in closed relation, a light source, energizing means for the light source and a manually-operable member movable in the body to actuate the securing element to release the cover, said member being further movable to control the energizing means, the respective movements of the member being successive or independently selective at will.

15. A vanity case including a body, a cover therefor, a catch on the body to engage and secure the cover, a light source in the body, energizing means for the light source, switching means for the energizing means, and a single manually operable member having an element to engage and operate the catch to release the cover when the member is moved in one direction, said member having means to operate the switching means when the member is moved in the opposite direction, the respective movements of the member being successive or selective at will.

16. In a vanity case, a body, a cover therefor, a compartment along one side of the body, longitudinally-alined spaced batteries in said compartment, a light source arranged between said batteries, a normally interrupted circuit to energize the light source from the batteries, and manually-operable sliding means for controlling the energizing of the light source from the outside of the vanity case, and members carried by and movable with said sliding means to conceal the light source in one position of said sliding means and to expose said light source in another position of said sliding means.

17. A vanity case including a body and a cover therefor, battery casings slidably mounted in alined relation in the body, a light source arranged between said casings, batteries mounted in the casings and movable therewith, switching means between the batteries and light source, said switching means being moved to operative position when the casings are moved from each other and moved to inoperative position when the casings are moved toward each other, the casings having extensions of a length to move to a position to conceal the light source when the casings are moved to positions to open the switching means and to expose the light source when the casings are moved to a position to close the switch.

18. A case having a removable lighting unit formed with a central normally open receiving chamber, a light source in the receiving chamber, sections slidable in the unit to close or open the receiving chamber, batteries carried by the sections, and circuit controlling means governed in the movement of the sections.

19. A construction as defined in claim 18, wherein the circuit between the batteries and light source is normally interrupted when the sections are in position to close the receiving chamber and operatively closed when the sections are moved to a position to expose the receiving chamber.

20. In a vanity case, a light source and a lens for the light source, the lens having a plain outer face and a composite inner face, the inner face presenting two curved control areas on normally-related diameters, the radius of one varying from the radius of the other, with each surface beyond the curved areas being straight and at substantially the same angle to the outer lens face, thus to provide that the refractive area of the inner face of the lens be substantially of oval form.

GEORGE M. CRESSATY.